United States Patent
Saiki et al.

(10) Patent No.: US 6,747,720 B2
(45) Date of Patent: Jun. 8, 2004

(54) POLARIZING PLATE WITH OPTICAL COMPENSATION FILM AND LIQUID CRYSTAL DISPLAY

(75) Inventors: Yuuji Saiki, Ibaraki (JP); Masayuki Satake, Ibaraki (JP); Yasushi Takahashi, Ibaraki (JP); Seiichi Kusumoto, Ibaraki (JP); Youichirou Sugino, Ibaraki (JP); Takuya Matsunaga, Ibaraki (JP); Senri Kondou, Ibaraki (JP); Takashi Shouda, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 142 days.

(21) Appl. No.: 10/071,270

(22) Filed: Feb. 8, 2002

(65) Prior Publication Data
US 2003/0151705 A1 Aug. 14, 2003

(51) Int. Cl.⁷ .................. G02F 1/1333; G02F 1/1335
(52) U.S. Cl. ............... 349/122; 349/96; 349/113; 349/117

(56) References Cited

U.S. PATENT DOCUMENTS

| | | | |
|---|---|---|---|
| 4,025,688 A | * 5/1977 | Nagy et al. | 428/350 |
| 4,268,127 A | * 5/1981 | Oshima et al. | 349/96 |
| 4,387,133 A | * 6/1983 | Ichikawa et al. | 428/215 |
| 4,810,523 A | * 3/1989 | Williams et al. | 427/505 |
| 5,880,800 A | * 3/1999 | Mikura et al. | 349/122 |
| 6,074,729 A | * 6/2000 | Watanabe et al. | 428/212 |
| 6,331,882 B1 | * 12/2001 | Shimodaira et al. | 349/122 |
| 6,404,469 B1 | * 6/2002 | Kitagawa et al. | 349/96 |
| 6,582,789 B1 | * 6/2003 | Sumi | 428/40.1 |
| 6,600,529 B1 | * 7/2003 | Kusumoto et al. | 349/96 |
| 2002/0015807 A1 | * 2/2002 | Sugino et al. | 428/1.31 |

FOREIGN PATENT DOCUMENTS

JP    2001272542 A  * 10/2001

OTHER PUBLICATIONS

Liotine et al., "Thermal Management Performance and Attachment Reliability USING Urethane Film Adhesives".*
"Semiconductor Products", Technical Bulletin, 02/02.*
Norland Optical Adhesive (NOA) and Special Applications Selector Guide.*

* cited by examiner

Primary Examiner—Tarifur R. Chowdhury
(74) Attorney, Agent, or Firm—Westerman, Hattori, Daniels & Adrian, LLP

(57) ABSTRACT

A polarizing plate is provided with an optical compensation film and includes a polarizing plate, an adhesive layer A, an optical compensation film, and an adhesive layer B adhered to one another, wherein the polarizing plate comprises a polyvinyl alcohol polarizing film containing a dichroic substance, and wherein the elastic modulus of the adhesive layer A of the polarizing plate with an optical compensation film is not greater than 0.06 MPa. Furthermore, a liquid crystal display is provided in which the polarizing plate with an optical compensation film is furnished on at least one side of the liquid crystal cell. Thus, display irregularities can be improved.

56 Claims, 1 Drawing Sheet

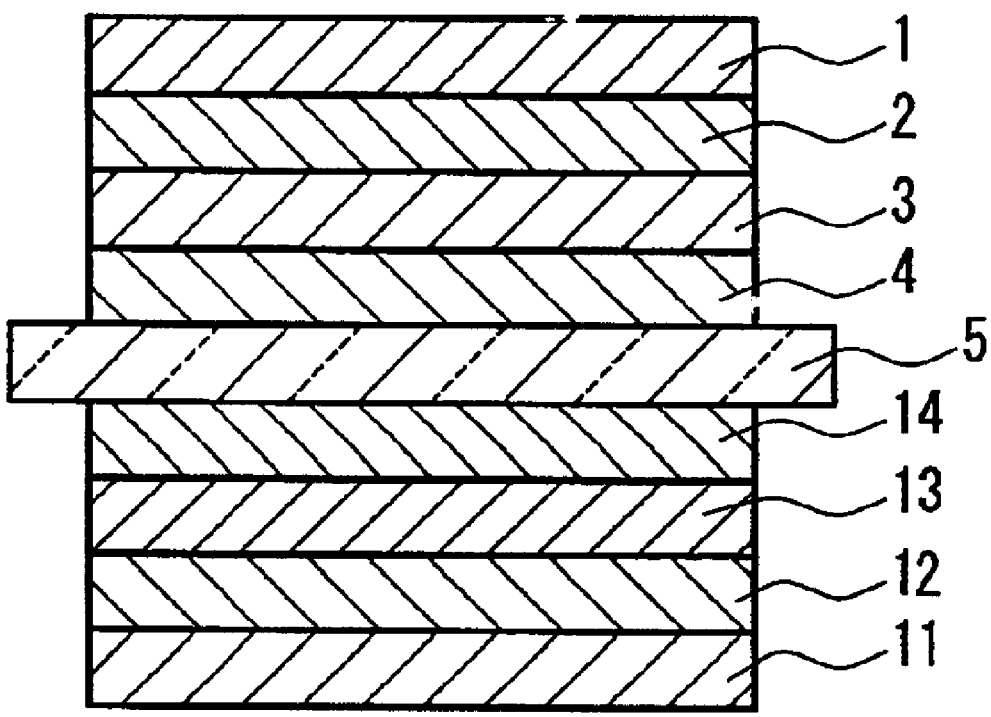
F I G. 1

POLARIZING PLATE WITH OPTICAL COMPENSATION FILM AND LIQUID CRYSTAL DISPLAY

FIELD OF THE INVENTION

The present invention relates to a polarizing plate with an optical compensation film for use in a liquid crystal display (hereinafter, abbreviated as "LCD") with improved display irregularities, and to a liquid crystal display.

BACKGROUND OF THE INVENTION

Optical compensation films are used in super twisted nematic (STN) LCDs in order to perform black and white display or color display. Furthermore, optical compensation films with uniaxially or biaxially stretched polymer films, and optical compensation films with oriented liquid crystal polymers are used in thin film transistor (TFT) LCDs in order to achieve a broad viewing angle.

Polarizing plates used in display devices (particularly in LCDs) are fabricated, for example, by dyeing a polyvinyl alcohol film (hereinafter, abbreviated as "PVA film") with iodine, which is dichroic, or a dichroic dye in a dyeing step, crosslinking the film with boric acid or borax, for example, in a crosslinking step, and stretching the film uniaxially in a stretching step. The steps for dyeing, crosslinking, and stretching do not have to be performed separately and can be performed simultaneously. There is no particularly specific order to the steps. After these steps, the PVA film is dried and a protective layer such as a triacetyl cellulose film (hereinafter, abbreviated as "TAC film") is adhered on it.

When a LCD panel is lit, the heat generated from the backlight, for example, warms the polarizing plate and the optical compensation film to 40 to 60° C., and the polarizing plate and the optical compensation film are expanded by linear expansion. The polarizing plate and the optical compensation film are laminated on one another via an adhesive agent, however, the polarizing plate has a larger dimensional change. For that reason, stress due to the difference in dimensional change between the polarizing plate and the optical compensation film is applied to the optical compensation film side, which results in the generation of display irregularities in the LCD panel.

SUMMARY OF THE INVENTION

The present invention provides a polarizing plate with an optical compensation film for use in a LCD, and a liquid crystal display, in which display irregularities have been improved.

In embodiments of the present invention, a polarizing plate with an optical compensation film includes a polarizing plate, an adhesive layer A, an optical compensation film, and an adhesive layer B adhered to one another, wherein the polarizing plate comprises a polyvinyl alcohol polarizing film containing a dichroic substance, and wherein the elastic modulus of the adhesive layer A is 0.06 MPa or less.

In some embodiment of the invention, a liquid crystal display is furnished at least on one side of the liquid crystal cell with a polarizing plate with an optical compensation film including a polarizing plate, an adhesive layer A, an optical compensation film, and an adhesive layer B adhered to one another, wherein the polarizing plate comprises a polyvinyl alcohol polarizing film containing a dichroic substance, and wherein the elastic modulus of the adhesive layer A is 0.06 MPa or less.

BRIEF DESCRIPTION OF THE DRAWINGS

FIG. 1 is a schematic cross-sectional view of an embodiment of the polarizing plate with an optical compensation film in accordance with the present invention.

DESCRIPTION OF THE PREFERRED EMBODIMENTS

In embodiments of the invention, a polarizing plate with an optical compensation film includes a polarizing plate, an adhesive layer A, an optical compensation film, and an adhesive layer B. The elastic modules of the adhesive layer A is 0.06 MPa or less.

In one embodiment of a polarizing plate with an optical compensation film, it is preferable that the elastic modulus of the adhesive layer B is at least 0.08 MPa. It is even more preferable that the elastic modulus of the adhesive layer B is at least 0.09 MPa and at most 0.12 MPa.

In one embodiment of a polarizing plate with an optical compensation film, it is preferable that the optical compensation film is made of a triacetyl cellulose film and a layer with an oriented liquid crystal.

With the polarizing plate with an optical compensation film in accordance with the present invention, by making the elastic modulus of the adhesive layer A not greater than 0.06 MPa, it is possible to relieve the stress generated by the difference in dimensional change between the polarizing plate and the optical compensation film, which may be caused by heat generated from the backlight, for example.

Furthermore, in some embodiments wherein the elastic modulus of the adhesive layer B is at least 0.08 MPa, it may be possible to prevent the optical compensation film from being deformed by stress generated by the dimensional change of the polarizing plate, which causes phase retardation, so that display irregularities in the LCD panel can be improved.

The following is an explanation with reference to the drawing. FIG. 1 is an embodiment of a polarizing plate with an optical compensation film in accordance with the present invention. As shown in FIG. 1, the basic configuration of the polarizing plate includes a polarizing plate 1, an adhesive layer A 2, an optical compensation film 3, and an adhesive layer B 4, adhered to a liquid crystal panel 5, and/or on the other side of the liquid crystal panel 5, a polarizing plate 11, an adhesive layer A 12, an optical compensation film 13, and an adhesive layer B 14, adhered to the liquid crystal panel 5. In some embodiments, the adhesive layers A 2 and 12 may be, for example, acrylic adhesive agents applied at a thickness in the range of 10 to 40 $\mu$m. In some embodiment, the adhesive layers B 4 and 14 may be, for example, acrylic adhesive agents applied at a thickness in the range of 10 to 40 $\mu$m. In some embodiments, the optical compensation films 3 and 13 may be, for example, a film known by the trademark "WV A02W" made by Fuji Photo Film Co., Ltd.

In one embodiment of the present invention, a transparent protective film as a protective layer may be adhered to one side or both sides of a polarizer made of a polyvinyl alcohol polarizing film including a dichroic substance, for example, via a suitable adhesive layer, such as an adhesive layer made of a vinyl alcohol polymer.

For the polarizer (polarizing film) it is possible to use a suitable film made of a suitable vinyl alcohol polymer corresponding to conventional polymers such as polyvinyl alcohol or partially polymerized polyvinyl alcohol, which is subjected to suitable processes, such as a dyeing process with a dichroic substance such as iodine or a dichroic dye, a stretching process and a crosslinking process, which are performed in a suitable order and form, and which transmits linearly polarized light when natural light is incident on it. It may be particularly preferable that the film has superior light transmittance and polarization degree.

For the material of the protective film serving as the transparent protective film provided on one side or both sides of the polarizer (polarizing film), a suitable transparent film may be used. As a polymer example, ordinarily an acetate resin such as triacetyl cellulose can be used; however, there is no limitation to this.

From the aspect of polarizing properties and durability, for example, it may be preferable that a triacetyl cellulose film in which the surface has been saponified with an alkali is used for the transparent protective film. When a transparent protective film is provided on both sides of the polarizing film, it is possible to use transparent protective films made of different polymers for the front and back.

The transparent protective film used for the protective layer may have undergone a hard-coat treatment, an anti-reflective treatment, or an anti-sticking, diffusion, or anti-glare treatment, for example. A hard-coat treatment may be performed for the purpose of preventing damage to the surface of the polarizing plate, for example. A hard-coat treatment can form on the surface of the transparent protective film a hardened skin with superior hardness and slide properties, for example, with a suitable ultraviolet light hardened resin that is silicone based, for example.

An anti-reflective treatment may be performed for the purpose of preventing the reflection of outside light by the polarizing plate surface. An anti-reflective treatment may be achieved by the formation of a conventional anti-reflective film, for example. Anti-sticking may be performed to prevent close adhesion with neighboring layers. An anti-glare treatment may be performed in order to prevent the visibility of light transmitted by the polarizing plate from being inhibited by the reflection of outside light by the surface of the polarizing plate. An anti-glare treatment can be achieved by a suitable process such as surface roughening by sand-blasting or embossing, or admixing transparent microscopic particles to give the surface of the transparent protective film a microscopic asperites.

Examples of the aforementioned transparent microscopic particles may include silica, alumina, titania, zirconia, tin oxide, indium oxide, cadmium oxide, or antimony oxide of average particle sizes of 0.5 to 20 $\mu$m. It is also possible to use inorganic microscopic particles that are electrically conductive. It is furthermore also possible to use organic microscopic particles made of crosslinked or not crosslinked polymer particulates, for example. The amount of transparent microscopic particles typically used is generally 2 to 70 parts by weight, and more particularly 5 to 50 parts by weight, per 100 parts by weight of transparent resin.

The anti-glare layer in which transparent microscopic particles are admixed can be provided as the transparent protective layer itself or as a layer applied to the surface of the transparent protective layer, for example. The anti-glare layer may also serve at the same time as a dispersion layer for dispersing the light transmitted by the polarizing plate so as to increase the viewing angle (viewing angle compensating function, for example). It should be noted that the above-described anti-reflective layer, the anti-sticking layer, the dispersion layer, and the anti-glare layer, for example, can be provided separate from the transparent protective layer as optical layers made of a sheet, for example, that has been provided with those layers.

In the present invention, there is no particular limitation to the process for adhering the polarizer (polarizing film) and the protective film, that is, the transparent protective film. The process for adhering may be conducted using, for example, an adhesive made from a vinyl alcohol polymer or an adhesive made from at least a water soluble crosslinking agent for vinyl alcohol polymer, such as boric acid, borax, glutaraldehyde, melamine, or oxalic acid. This adhesive layer can be formed by applying and drying an aqueous solution. When preparing that aqueous solution, it is also possible to admix other additives or catalysts such as acid, when necessary.

A polarizing plate according to the present invention can be used as an optical element laminated with other optical layers. There are no particular limitations regarding the optical layers, and for example it is possible to use one or two or more suitable optical layers used in the formation of liquid crystal displays or the like, such as a reflecting plate, a semitransparent reflector, a retardation plate (including $\lambda$ plates such as half wavelength plates and quarter wavelength plates), a viewing angle compensating film, and a brightness enhanced film. In one embodiment, a polarizing plate may be preferable that is a reflective polarizing plate or a semi-transparent reflective polarizing plate in which a reflecting plate or a semitransparent reflector is further laminated on the polarizing plate made of a polarizer and a protective layer in accordance with the present invention; an elliptically or circularly polarizing plate in which a retardation plate is further laminated on the polarizing plate made of a polarizer and a protective layer in accordance with the present invention; a polarizing plate in which a viewing angle compensating film is further laminated on the polarizing plate made of a polarizer and a protective layer in accordance with the present invention; or a polarizing plate in which a brightness enhanced film is further laminated on the polarizing plate made of a polarizer and a protective layer in accordance with the present invention.

The above-noted reflecting plate may be provided on the polarizing plate to form a reflective polarizing plate. A reflective polarizing plate is ordinarily provided on the back side of the liquid crystal cell, and can form the type of liquid crystal display, for example, which reflects and displays incident light from the viewing side (display side), and is advantageous in that it obviates the incorporation of a light source, such as a backlight, and makes it easy to attain a thinner liquid crystal display.

It is possible to form the reflective polarizing plate, for example, by performing a suitable method in which, if necessary, a reflective layer made of metal, for example, is attached to one side of the polarizing plate via the transparent protective film, for example. As a more specific example, the reflective layer may be formed by attaching a foil made of a reflective metal, such as aluminum or a vapor deposited film, to one side of a matted transparent protective film.

Another example is a reflective polarizing plate with a reflective layer including fine particles, such that their microscopic asperites is reflected by the transparent protective film. A reflective layer with a surface having a microscopic asperites is advantageous because, for example, it can disperse incident light by diffused reflection to prevent directionality and glare, and inhibit irregularities in brightness. A reflective layer with a microscopic asperites reflecting the microscopic asperites of the surface of the transparent protective film can be formed, for example, by a method in which metal is directly attached to the surface of the transparent protective film using a suitable process such as a plating process or a vapor deposition process like vacuum vapor deposition, ion plating, or sputtering.

As a substitute for the above-described process of directly attaching the reflecting plate to the transparent protective film of the polarizing plate, it is possible to use a reflective sheet or the like made by providing the reflective layer on an appropriate film corresponding to the transparent protective film. The reflective layer of the reflecting plate is ordinarily made of metal, and from the aspect of preventing a drop in reflectance due to oxidation, which in turn results in the long-term preservation of the initial reflectance, and avoiding separately attaching a protective layer, it may be preferably used in a configuration in which its reflective surface is covered by the film or the polarizing plate, for example.

A semitransparent polarizing plate can be obtained by making the reflective layer in the above a semitransparent reflecting layer such as a half mirror which reflects and transmits light. With the semitransparent polarizing plate, which is ordinarily provided on the back side of the liquid crystal cell, it is possible to form a liquid crystal display, wherein, in a relatively bright environment, incident light from the viewing side (display side) is reflected to display the image, and in a relatively dark environment, the internal light source, such as a backlight, incorporated at the back side of the semitransparent polarizing plate is used to display the image. This means that the semitransparent polarizing plate can be useful in the fabrication of a type of liquid crystal display, for example, which in a bright environment can conserve the energy consumed by the light source such as a backlight, and in a relatively dark environment the internal light source can be used.

The following is a description of the elliptically or circularly polarizing plate in which a retardation plate is further laminated on the above-mentioned polarizing plate made of a polarizer and a protective layer in accordance with the present invention.

A retardation plate or the like can be used to change linearly polarized light into elliptical or circular polarized light, to change elliptical or circular polarized light into linearly polarized light, or to change the polarization direction of linearly polarized light. In particular, a so-called quarter wavelength plate (also known as a $\lambda/4$ plate) can be used as a retardation plate for changing linearly polarized light into elliptical or circular polarized light and for changing elliptical or circular polarized light into linearly polarized light. A half wavelength plate (also known as a $\lambda/2$ plate) is ordinarily used when changing the direction of polarization of linearly polarized light.

An elliptically polarizing plate compensates coloring (blue or yellow) caused by birefringence of the liquid crystal layer in STN liquid crystal displays, and can be used effectively when, for example, making a black and white display without such coloring. Moreover, an elliptically polarizing plate in which the refractive index is controlled three-dimensionally may be preferable because it can also compensate (prevent) coloring caused when the screen of the liquid crystal display is viewed obliquely. A circularly polarizing plate can be used effectively when adjusting the coloring of an image of a reflective liquid crystal display that displays color images, for example, and also has the ability to prevent reflection.

Specific examples of a retardation plate include birefringent films, oriented films of a liquid crystal polymer, and films in which an oriented layer of a liquid crystal polymer is supported by the film, and such films are made by stretching a film made from polycarbonate, polyvinyl alcohol, polystyrene, polymethyl methacrylate, polypropylene, or other suitable polymers such as polyolefines, polyalylates, or polyamides. Examples of a tilted oriented film include films in which a heat shrinkable film is adhered to a polymer film and that polymer film is stretched and/or shrunken by a shrinkage force due to added heat, and films in which a liquid crystal polymer is oriented obliquely.

The following is a description of a polarizing plate in which a viewing angle compensating film is further laminated on the polarizing plate made of a polarizer and a protective layer in accordance with the present invention.

Viewing angle compensating films are films for widening the viewing angle such that when the screen of the liquid crystal display is viewed not perpendicularly but somewhat obliquely, the image can still be seen relatively clearly.

For viewing angle compensating films, it is possible to use a retardation plate or a film in which a discotic liquid crystal is applied, for example, to a triacetyl cellulose film. For ordinary retardation plates, a birefringent polymer film that has been unaxially stretched in the surface direction is used, whereas for retardation plates used as viewing angle compensating films, birefringent polymer films that are stretched biaxially in the surface direction are used, or films stretched in two directions, such as tilted oriented polymer films stretched uniaxially in the surface direction and also stretched in the thickness direction, in which the refractive index in the thickness direction is controlled. As mentioned earlier, examples of tilted oriented films include films in which a heat shrinkable film is adhered to a polymer film and then heat is added to stretch and/or shrink that polymer film by a shrinkage force due to the added heat, and films in which a liquid crystal polymer is oriented obliquely. The same polymers as those explained for the retardation plate can be used as the base material for the polymer of the retardation plate.

A polarizing plate in which a brightness enhanced film is laminated on the above polarizing plate made of a polarizer and a protective layer in accordance with the present invention can be ordinarily used provided on the back side of the liquid crystal cell. The brightness enhanced film exhibits the characteristic of reflecting linearly polarized light of a specific polarizing axis or circular polarized light of a specific direction, and transmitting all other light, when natural light is incident thereon from the backlight of the liquid crystal display, or reflected from the back side, for example. Thus, a polarizing plate in which a brightness enhanced film is laminated with the above polarizing plate made of a polarizer and protective layer allows light from a light source such as a back light to be incident and obtains transmitted light of a specific polarization state and reflects light other than that specific polarization state without transmitting it. The light that is reflected by this brightness enhanced film surface is further reflected by a reflective layer or the like provided behind that surface and is once again incident on the brightness enhanced plate, where a portion or all of this light is transmitted as light of a specific polarization state so as to increase the amount of light that passes through the brightness enhanced film. Polarized light not easily absorbed by the polarizer may be supplied to increase the amount of light which can be used in the liquid crystal image display, for example, and therefore the brightness enhanced film can increase the brightness. This means that without using the brightness enhanced film, when light from a back light, for example, passes through the polarizer from the rear side of the light crystal cell and is incident on the polarizer, then most of the light with a polarization direction incongruent with the polarization axis of the polarizer is absorbed by the polarizer and does not pass through it. That is to say, although there are differences depending on the properties of the polarizer being used, approximately 50% of the light is absorbed by the polarizer, which means that the amount of light that can be used in the liquid crystal image display is reduced accordingly, and the image becomes dark. The brightness enhanced film repeatedly reflects light with a polarization direction such as that absorbed by the polarizer without allowing it to be incident on the polarizer, and that light is then reversed by a reflective layer or the like provided behind the brightness enhanced film and once again incident on the brightness enhanced plate. The polarization direction of light being reflected and reversed between the brightness enhanced film and the polarizing layer becomes a polarization direction that can be transmitted by the polarizer, and that polarized light is transmitted and supplied to the polarizer by the brightness enhanced film. Thus, the brightness enhanced film can be used to efficiently display with light from the backlight images with the light crystal display, and can brighten the screen.

For the above brightness enhanced film, a suitable film which exhibits the characteristic of transmitting linearly polarized light of a specific polarization axis and reflecting other light, such as multiple layers of a dielectric thin film or a multi-layered body of thin films with different refractive index anisotropic properties, can be used. It is also possible to use a suitable film that exhibits the characteristic of reflecting either clockwise or counterclockwise circular polarized light and transmitting all other light, such as a cholesteric liquid crystal layer, which can be an oriented film of a cholesteric liquid crystal polymer or a film in which that oriented liquid crystal layer is supported on a film base.

Consequently, with a brightness enhanced film which transmits linearly polarized light of a specific polarization axis, the transmitted light can be made incident with a polarization axis matching that of the polarizing plate, and thus absorption loss by the polarizing plate can be inhibited and it can transmit light efficiently. Alternatively, with a brightness enhanced film which transmits circular polarized light, such as a cholesteric liquid crystal layer, the transmitted light can be made incident on the polarizer as is, but from the aspect of inhibiting absorption loss, it is preferable that the circular polarized light which is transmitted is made into linearly polarized light via a retardation plate and then is incident on the polarizing plate. A quarter wavelength plate can be used for this retardation plate for converting circular polarized light into linearly polarized light.

A retardation plate functioning as a quarter wavelength plate in a wide wavelength range of visible light can be obtained by a process in which a retardation layer functioning as a quarter wavelength plate with respect to monochromatic light, such as light of a 550 nm wavelength, is stacked on another retardation layer which exhibits other phase retardation properties, such as a retardation layer functioning as a half wavelength plate. Consequently, it is also possible that the retardation plate disposed between the polarizing plate and the brightness enhanced film is made of one or two or more retardation layers.

It should be noted that by making the cholesteric liquid crystal layer a structure having a combination of layers which reflect different wavelengths and in which two or three or more layers are disposed stacked on one another, it is possible to obtain a cholesteric liquid crystal layer in which circular polarized light is reflected over a wide wavelength range of visible light, for example, and accordingly it is possible to obtain circular polarized light transmitted over a wide wavelength range.

The polarizing plate of the present invention can also be made by laminating two or three or more optical layers, such as the above-described polarization separation type polarizing plate. Consequently, the polarizing plate can also be a reflective elliptically polarizing plate or a semitransparent elliptically polarizing plate in which the above reflective polarizing plate or the semitransparent polarizing plate is combined with a retardation plate. Optical elements in which two or three or more optical layers are laminated can be formed by sequentially and separately laminating them in the process for fabricating the liquid crystal display, for example. However, optical elements laminated in advance are advantageous in that they have excellent product stability and assembly properties, and can increase the manufacturing efficiency of the liquid crystal display. A suitable means for adhesion, such as an adhesive layer, can be used in laminating the layers.

The polarizing plate and optical elements in accordance with the present invention can also be provided with an adhesive layer for adhesion with other components such as the liquid crystal cell. That adhesive layer can be made of an appropriate conventional adhesive agent, such as an acrylic adhesive agent. It is particularly preferable that the adhesive layer has a low moisture absorption rate and excellent heat resistance properties, from the aspect of preventing the problems of foaming and peeling due to moisture absorption, preventing a drop in optical properties and warping of the liquid crystal cell due to differences in thermal expansion, for example, and in turn the ability to fabricate a high-quality liquid crystal display having excellent durability. It is also possible to add fine particles to the adhesive layer so that it exhibits optical dispersion properties, for example. The adhesive layer, if necessary, can be provided on the surface where necessary. For example, with regard to the protective layer of the polarizing plate made of a polarizer and protective layer in accordance with the present invention, an adhesive layer can be provided on one side or both sides of the protective layer, if necessary.

It is preferable that when the adhesive layer provided on the polarizing plate or optical element has an exposed surface, it is provisionally covered by a separator for the purpose of preventing contamination, for example, until the adhesive layer is actually used. The separator can be made by providing a suitable thin film corresponding to the above-mentioned transparent protective film with a strippable coating with a suitable stripping agent based on silicone, a long-chain alkyl, fluorine, or molybdenum sulfide, for example, if necessary.

It should be noted that the various layers, such as the polarizing film, the transparent protective film, the optical layers, and the adhesive layers, which form the above polarizing plate and optical elements, can be given the ability to absorb ultraviolet light by a suitable process such as treating them with an ultraviolet light absorbing agent such as a salicylate ester compound, a benzophenone compound, a benzotriazole compound, a cyanoacrylate compound, or a nickel complex salt compound.

The polarizing plate in accordance with the present invention may be favorably used to form various types of devices, such as a liquid crystal display. The polarizing plate in accordance with the present invention can be disposed on one or both sides of the liquid crystal cell to form a transmissive, reflective, or both transmissive and reflective liquid crystal display having a suitable conventional structure. Consequently, the liquid crystal cell of the liquid crystal display is not restricted, and for example can be a suitable liquid crystal cell of an active matrix drive type, for which the thin film transistor type is typical, or a simple matrix drive type, for which the twisted nematic and super twisted nematic types are typical.

Furthermore, when polarizing plates or optical elements are provided on both sides of the liquid crystal cell, they can be identical or different. Furthermore, when forming the liquid crystal display, it is possible to dispose one or two or more layers of suitable components such as a prism array sheet, a lens array sheet, a light diffusion plate, or a backlight, at suitable locations.

The present invention is a polarizing plate with an optical compensation film and includes a polarizing plate, an adhesive layer A, an optical compensation film, and an adhesive layer B, and by making the elastic modulus of the adhesive layer A not greater than 0.06 MPa, it is possible to provide a polarizing plate with an optical compensation film, and a liquid crystal display, in which display irregularities are improved.

WORKING EXAMPLES

Aspects of the present invention will be described in further detail using the following working examples.

Method for Measuring the Elastic Modulus

The elastic modulus (Young's modulus) was determined by applying the adhesive layers at a thickness of 1 mm, laminating them, cutting out a portion with a size of 5 mm height×20 mm width, and then in the width direction using a tension test apparatus to determine the stress-deformation curve at the parameters of a 300 mm tension speed and a 10 mm chuck interval distance.

Method for Evaluating the Liquid Crystal Panel

An LCD panel obtained by the following working examples and comparative examples was turned on and set to dark display, and after leaving the LCD panel on for one hour, the brightness at its surface was measured using a brightness measurement device known by the trademark "Liquid Crystal Color Distribution Measurement Device CA-1000" made by Minolta Co., Ltd., to determine the standard variation of the brightness across the surface. A lower number means less display irregularities.

First Working Example

An 80 μm thick polyvinyl alcohol film was immersed in a dyebath (30° C.) of mixed iodine and potassium iodide, dyed and uniaxially stretched to five times its original size, and then dried. Next, an adhesive was used to adhere an 80 μm thick triacetyl cellulose film as a protective film to both sides of the polyvinyl alcohol film after it has been dyed by the iodine, thus obtaining the polarizing plate.

For an optical compensation film, a film known by the trademark "WV A02B" made by Fuji Photo Film Co., Ltd., was used. This is a film made of a triacetyl cellulose film and a layer of oriented liquid crystal.

These films were cut at a certain axial angle and into a certain size and laminated to both sides of a thin film transistor liquid crystal display (TFT-LCD cell) via adhesive agents A and B, as shown in FIG. 1.

For the adhesive agent A, 100 parts by weight of isononyl acrylate, 0.2 parts by weight of 2-hydroxyethyl acrylate, and 0.5 parts by weight of azobisisobutyronitrile were dissolved in ethyl acetate such that the monomer concentration is 50 weight percent. The solution was polymerized at 60° C. for eight hours. Then 0.2 parts by weight of an isocyanate cross-linking agent (known by the trade name Coronate L by Nippon Polyurethane Industry Co., Ltd.) were added per 100 parts by weight of the cured polymer solution, to make an adhesive syrup. This adhesive syrup was dried and then applied at a thickness of 25 μm. The elastic modulus was found to be 0.04 MPa.

For the adhesive agent B, 100 parts by weight of butyl acrylate, 0.2 parts by weight of 2-hydroxyethyl acrylate, and 0.5 parts by weight of azobisisobutyronitrile were dissolved in ethyl acetate such that the monomer concentration is 50 weight percent. The solution was polymerized at 60° C. for eight hours. Then, 0.2 parts by weight of an isocyanate cross-linking agent (known by the trade name Coronate L by Nippon Polyurethane Industry Co., Ltd.) were added per 100 parts by weight of the cured polymer solution, to make an adhesive syrup. This adhesive syrup was dried and then applied at a thickness of 25 μm. The elastic modulus was found to be 0.1 MPa.

The results of the evaluation of the obtained liquid crystal panel are shown in Table 1 below.

Second Working Example

The second working example corresponds to the first working example, except that an acrylic adhesive agent with an elastic modulus of 0.04 MPa (adhesive agent A used in the first working example) is used for both the adhesive agents A and B.

First Comparative Example

The first comparative example corresponds to the first working example, except that an acrylic adhesive agent with an elastic modulus of 0.1 MPa (adhesive agent B used in the first working example) is used for both the adhesive agents A and B.

Second Comparative Example

The second comparative example corresponds to the first working example, except that an acrylic adhesive agent with an elastic modulus of 0.1 MPa (adhesive agent B used in the first working example) is used for the adhesive agent A, and an acrylic adhesive agent with an elastic modulus of 0.04 MPa (adhesive agent A used in the first working example) is used for the adhesive agent B.

The results of the above are illustrated in Table 1 below.

TABLE 1

|  | Elastic Modulus of Adhesive Agent A (MPa) | Elastic Modulus of Adhesive Agent B (MPa) | Standard Variation in Brightness of LCD Screen |
| --- | --- | --- | --- |
| First Working Example | 0.04 | 0.1 | 0.05 |
| Second Working Example | 0.04 | 0.04 | 0.06 |
| First Comparative Example | 0.1 | 0.1 | 0.08 |
| Second Comparative Example | 0.1 | 0.04 | 0.10 |

As is apparent from Table 1, when the elastic modulus of the adhesive agent A exceeds 0.06 MPa, the result of the evaluation is 0.08 or more, but when its elastic modulus is 0.06 MPa or less the result of the evaluation is 0.06 or less, which confirms that display irregularities are reduced. Furthermore, when the elastic modulus of the adhesive agent A is 0.06 MPa or less and the elastic modulus of the adhesive agent B is 0.08 MPa or more the result of the evaluation is 0.05, which confirms that display irregularities are reduced.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A polarizing plate with an optical compensation film, comprising a polarizing plate, an adhesive layer A, an optical compensation film, and an adhesive layer B, laminated to one another,
   wherein the polarizing plate comprises a polyvinyl alcohol polarizing film containing a dichroic substance, and
   wherein an elastic modulus of the adhesive layer A is not greater than 0.06 Mpa.

2. The polarizing plate with an optical compensation film according to claim 1, wherein the elastic modulus of the adhesive layer A is at least 0.02 MPa and at most 0.05 MPa.

3. The polarizing plate with an optical compensation flint according to claim 1, wherein the elastic modulus of the adhesive layer B is at least 0.08 MPa.

4. The polarizing plate with an optical compensation film according to claim 3, wherein the elastic modulus of the adhesive layer B is at least 0.09 MPa and at most 0.12 MPa.

5. The polarizing plate with an optical compensation film according to claim 1, wherein both the adhesive layer A and the adhesive layer B are adhesive agents comprising an acrylic resin.

6. The polarizing plate with an optical compensation film according to claim 1, wherein both the adhesive layer A and the adhesive layer B have a thickness in a range of at least 10 μm to at most 40 μm.

7. The polarizing plate with an optical compensation film according to claim 1, wherein a triacetyl cellulose film is formed integrally with at least one surface of the polarizing film.

8. The polarizing plate with an optical compensation film according to claim 1, wherein the optical compensation film comprises a film with an oriented liquid crystal polymer.

9. The polarizing plate with an optical compensation film according to claim 1, wherein a triacetyl cellulose film is formed integrally with at least one surface of the optical compensation film.

10. The polarizing plate with an optical compensation film according to claim 1, wherein at least one selected from the group consisting of a reflecting plate, a semitransparent reflector, a retardation plate, a λ plate, and a brightness enhancement film is further laminated to the polarizing plate.

11. A liquid crystal display, comprising:
   a liquid cell; and
   a polarizing plate with an optical compensation film on at least one side of the liquid crystal cell, the polarizing plate with the optical compensation film comprising a polarizing plate, an adhesive layer A, an optical compensation film, and an adhesive layer B, laminated to one another;
   wherein the polarizing plate comprises a polyvinyl alcohol polarizing film containing a dichroic substance, and
   wherein an elastic modulus of the adhesive layer A is not greater than 0.06 MPa.

12. The liquid crystal display according to claim 11, wherein the elastic modulus of the adhesive layer A is at least 0.02 MPa and at most 0.05 MPa.

13. The liquid crystal display according to claim 11, wherein the elastic modulus of the adhesive layer B is at least 0.08 MPa.

14. The liquid crystal display according to claim 13, wherein the elastic modulus of the adhesive layer B is at least 0.09 MPa and at most 0.12 MPa.

15. The liquid crystal display according to claim 11, wherein both the adhesive layer A and the adhesive layer B are adhesive agents comprising an acrylic resin.

16. The liquid crystal display according to claim 11, wherein both the adhesive layer A and the adhesive layer B have a thickness in a range of at least 10 μm to at most 40 μm.

17. The liquid crystal display according to claim 11, wherein a triacetyl cellulose film is formed integrally with at least one surface of the polarizing film.

18. The liquid crystal display according to claim 11, wherein the optical compensation film comprises a film with an oriented liquid crystal polymer.

19. The liquid crystal display according to claim 11, wherein a triacetyl cellulose film is formed integrally with at least one surface of the optical compensation film.

20. The liquid crystal display according to claim 11, wherein at least one selected from the group consisting of a reflecting plate, a semitransparent reflector, a retardation plate, a λ plate, and a brightness enhancement film is laminated to the polarizing plate.

21. A polarizing plate with an optical compensation film, comprising a polarizing plate, an adhesive layer A, and an optical compensation film, laminated to one another, wherein an elastic modulus of the adhesive layer A is not greater than 0.06 MPa.

22. The polarizing plate with an optical compensation film according to claim 21, wherein the elastic modulus of the adhesive layer A is at least 0.02 MPa and at most 0.05 Mpa.

23. The polarizing plate with an optical compensation film according to claim 21, further comprising an adhesive layer B laminated to the polarizing plate with an optical compensation film.

24. The polarizing plate with an optical compensation film according to claim 23, wherein the elastic modulus of the adhesive layer B is at least 0.08 MPa.

25. The polarizing plate with an optical compensation film according to claim 23, wherein the elastic modulus of the adhesive layer B is at least 0.09 MPa and at most 0.12 MPa.

26. The polarizing plate with an optical compensation film according to claim 23, wherein the adhesive layer B is adhesive agents comprising an acrylic resin.

27. The polarizing plate with an optical compensation film according to claim 23, wherein the adhesive layer B has a thickness in a range of at least 10 μm to at most 40 μm.

28. The polarizing plate with an optical compensation film according to claim 21, wherein both the adhesive layer A is adhesive agents comprising an acrylic resin.

29. The polarizing plate with an optical compensation film according to claim 21, wherein the adhesive layer A has a thickness in a range of at least 10 μm to at most 40 μm.

30. The polarizing plate with an optical compensation film according to claim 21, wherein a triacetyl cellulose film is formed integrally with at least one surface of the polarizing film.

31. The polarizing plate with an optical compensation film according to claim 21, wherein the optical compensation film comprises a film with an oriented liquid crystal polymer.

32. The polarizing plate with an optical compensation film according to claim 21, wherein a triacetyl cellulose film is formed integrally with at least one surface of the optical compensation film.

33. The polarizing plate with an optical compensation film according to claim 21, wherein at least one element selected from the group consisting of a reflecting plate, a semitransparent reflector, a retardation plate, a μ plate, and a brightness enhancement film is further laminated to the polarizing plate.

34. The polarizing plate with an optical compensation film according to claim 33, wherein the at least one element is a reflecting plate.

35. The polarizing plate with an optical compensation film according to claim 33, wherein the at least one element is a semitransparent reflector.

36. The polarizing plate with an optical compensation film according to claim 33, wherein the at least one element is a retardation plate.

37. The polarizing plate with an optical compensation film according to claim 33, wherein the at least one element is a λ plate.

38. The polarizing plate with an optical compensation film according to claim 33, wherein the at least one element is a brightness enhancement plate.

39. A liquid crystal display, comprising:

a liquid cell; and an polarizing plate with an optical compensation film on at least one side of the liquid crystal cell, the polarizing plate with an optical compensation film comprising a polarizing plate, an adhesive layer A, and an optical compensation film, laminated to one another, wherein an elastic modulus of the adhesive layer A is not greater than 0.06 MPa.

40. The liquid crystal display according to claim 39, wherein the elastic modulus of the adhesive layer A is at least 0.02 MPa and at most 0.05 MPa.

41. The liquid crystal display with an optical compensation film according to claim 39, further comprising an adhesive layer B laminated to the polarizing plate with an optical compensation film.

42. The liquid crystal display with an optical compensation film according to claim 41, wherein the elastic modulus of the adhesive layer B is at least 0.08 MPa.

43. The liquid crystal display with an optical compensation film according to claim 41, wherein the elastic modulus of the adhesive layer B is at least 0.09 MPa and at most 0.12 MPa.

44. The liquid crystal display with an optical compensation film according to claim 41, wherein the adhesive layer B is adhesive agents comprising an acrylic resin.

45. The liquid crystal display with an optical compensation film according to claim 41, wherein the adhesive layer B has a thickness in a range of at least 10 μm to at most 40 μm.

46. The liquid crystal display with an optical compensation film according to claim 39, wherein both the adhesive layer A is adhesive agents comprising an acrylic resin.

47. The liquid crystal display with an optical compensation film according to claim 39, wherein the adhesive layer A has a thickness in a range of at least 10 μm to at most 40 μm.

48. The liquid crystal display with an optical compensation film according to claim 39, wherein a triacetyl cellulose film is formed integrally with at least one surface of the polarizing film.

49. The liquid crystal display with an optical compensation film according to claim 39, wherein the optical compensation film comprises a film with an oriented liquid crystal polymer.

50. The liquid crystal display with an optical compensation film according to claim 39, wherein a triacetyl cellulose film is formed integrally with at least one surface of the optical compensation film.

51. The liquid crystal display with an optical compensation film according to claim 39, wherein at least one element selected from the group consisting of a reflecting plate, a semitransparent reflector, a retardation plate, a λ plate, and a brightness enhancement film is further laminated to the polarizing plate.

52. The liquid crystal display with an optical compensation film according to claim 39, wherein the at least one element is a reflecting plate.

53. The liquid crystal display with an optical compensation film according to claim 51, wherein the at least one element is a semitransparent reflector.

54. The liquid crystal display with an optical compensation film according to claim 51, wherein the at least one element is a retardation plate.

55. The liquid crystal display with an optical compensation film according to claim 51, wherein the at least one element is a λ plate.

56. The liquid crystal display with an optical compensation film according to claim 51, wherein the at least one element is a brightness enhancement plate.

* * * * *